(12) United States Patent
Hanna et al.

(10) Patent No.: US 7,726,155 B2
(45) Date of Patent: Jun. 1, 2010

(54) COOLING APPARATUS FOR FIBERIZING BUSHINGS

(75) Inventors: Terry Joe Hanna, Millersport, OH (US); Thomas K. Thompson, Granville, OH (US); Walter Alexander Johnson, Centennial, CO (US); Russell Donovan Arterburn, Athens, TN (US)

(73) Assignee: Johns Manville, Denver, CO (US)

( * ) Notice: Subject to any disclaimer, the term of this patent is extended or adjusted under 35 U.S.C. 154(b) by 995 days.

(21) Appl. No.: 11/482,416

(22) Filed: Jul. 7, 2006

(65) Prior Publication Data

US 2008/0006059 A1 Jan. 10, 2008

(51) Int. Cl.
*C03B 37/10* (2006.01)

(52) U.S. Cl. ............... 65/481; 65/498; 65/512; 65/511

(58) Field of Classification Search ........... 65/481, 65/498, 511, 512; 165/148, 151, 47, 58, 165/67, 183; 264/165
See application file for complete search history.

(56) References Cited

U.S. PATENT DOCUMENTS

| | | | |
|---|---|---|---|
| 3,264,076 A | 8/1966 | Veazie et al. | |
| 3,512,948 A | 5/1970 | Glaser et al. | |
| 3,708,271 A | 1/1973 | Loewenstein et al. | |
| 3,746,525 A | 7/1973 | Kasuga et al. | |
| 4,155,732 A | 5/1979 | Schlachter et al. | |
| 4,272,271 A | 6/1981 | Thompson | |
| 4,285,712 A | 8/1981 | Thompson | |
| 4,310,602 A * | 1/1982 | Martin, Jr. | 428/596 |
| 4,337,075 A | 6/1982 | Mechell et al. | |
| 4,356,016 A | 10/1982 | Brosch et al. | |
| 4,397,665 A | 8/1983 | Harris | |
| 4,824,457 A | 4/1989 | Jensen | |
| 5,244,483 A | 9/1993 | Brosch et al. | |
| 5,693,118 A | 12/1997 | Snedden et al. | |
| 5,925,164 A | 7/1999 | Dowlati et al. | |
| 6,192,714 B1 | 2/2001 | Dowlati et al. | |
| 6,196,029 B1 | 3/2001 | Melia et al. | |
| 6,408,654 B1 | 6/2002 | Boessneck et al. | |
| 2005/0092031 A1 | 5/2005 | Johnson | |

OTHER PUBLICATIONS

Haynes International, Hastelloy C-2000 Alloy, 4 pages, Mar. 15, 2006.*
Wayback Machine time stamp for disclosure of Haynes International Hastelloy C-2000 Alloy webpage retrieved on Jul. 18, 2009.*

* cited by examiner

*Primary Examiner*—Steven P Griffin
*Assistant Examiner*—Queenie Dehghan
(74) *Attorney, Agent, or Firm*—Robert D. Touslee

(57) ABSTRACT

This invention involves apparatus and methods for making fibers by passing a molten material like glass, polymer, etc. through orifices or tips in a fiberizing bushing and then cooling the molten material coming from the tips and newly formed fibers using cooling tubes. The cooling tubes are made from precious metals and various alloys comprising precious metals, nickel and one or more of titanium, chromium, molybdenum, etc. The one or more fins attached to the top surface of a hollow tube to make the cooling tubes contain spaced apart gaps, notches and/or slots extending from the top edge of the fin to prevent warping of the fins and to make the cooling tube more bendable, adjustable during the operation of making fibers from molten material.

14 Claims, 3 Drawing Sheets

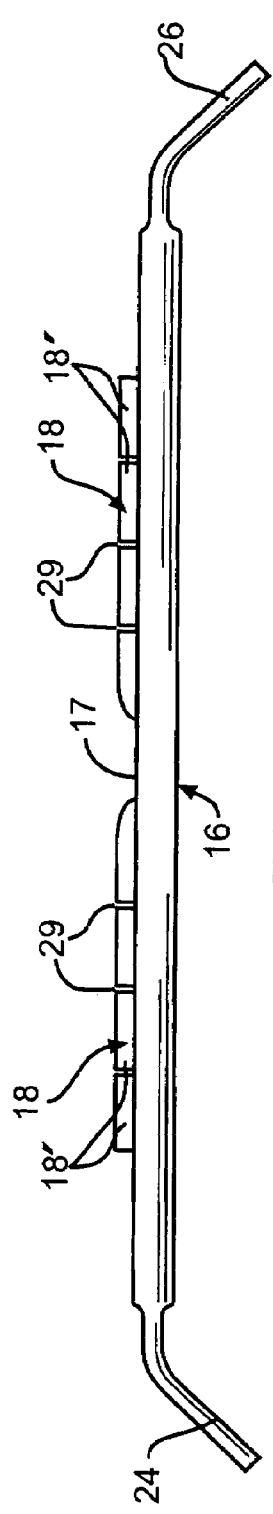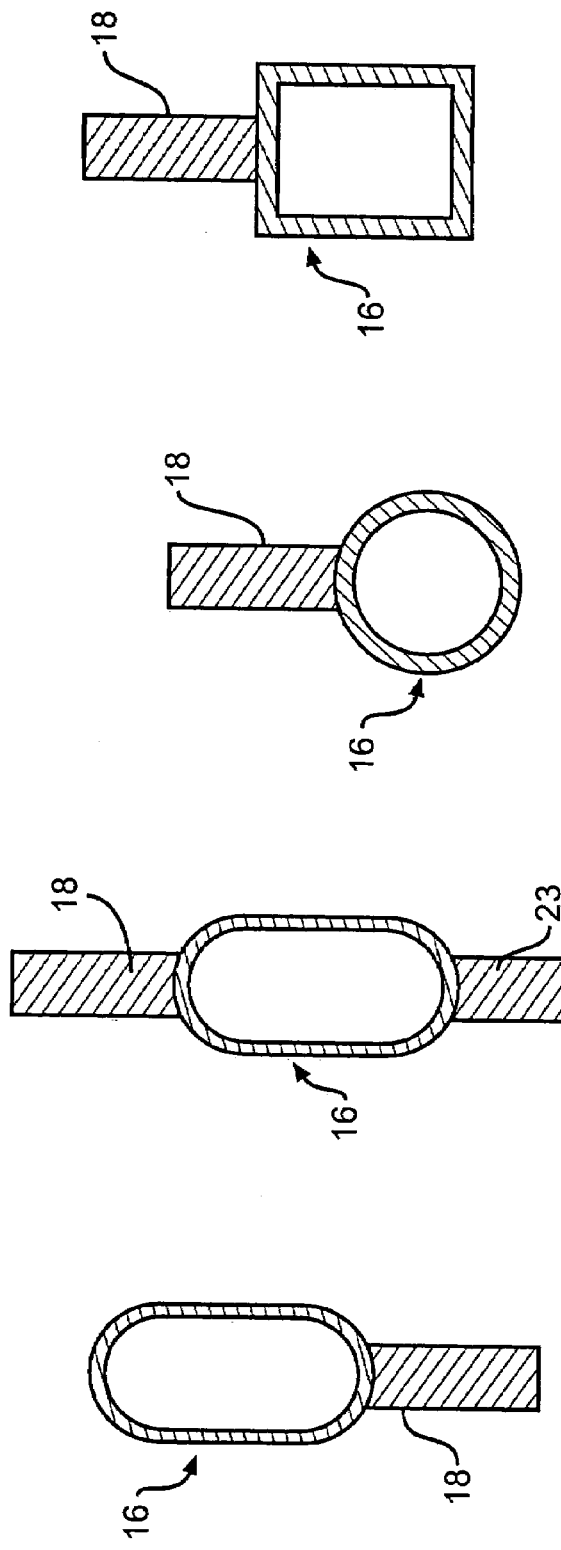

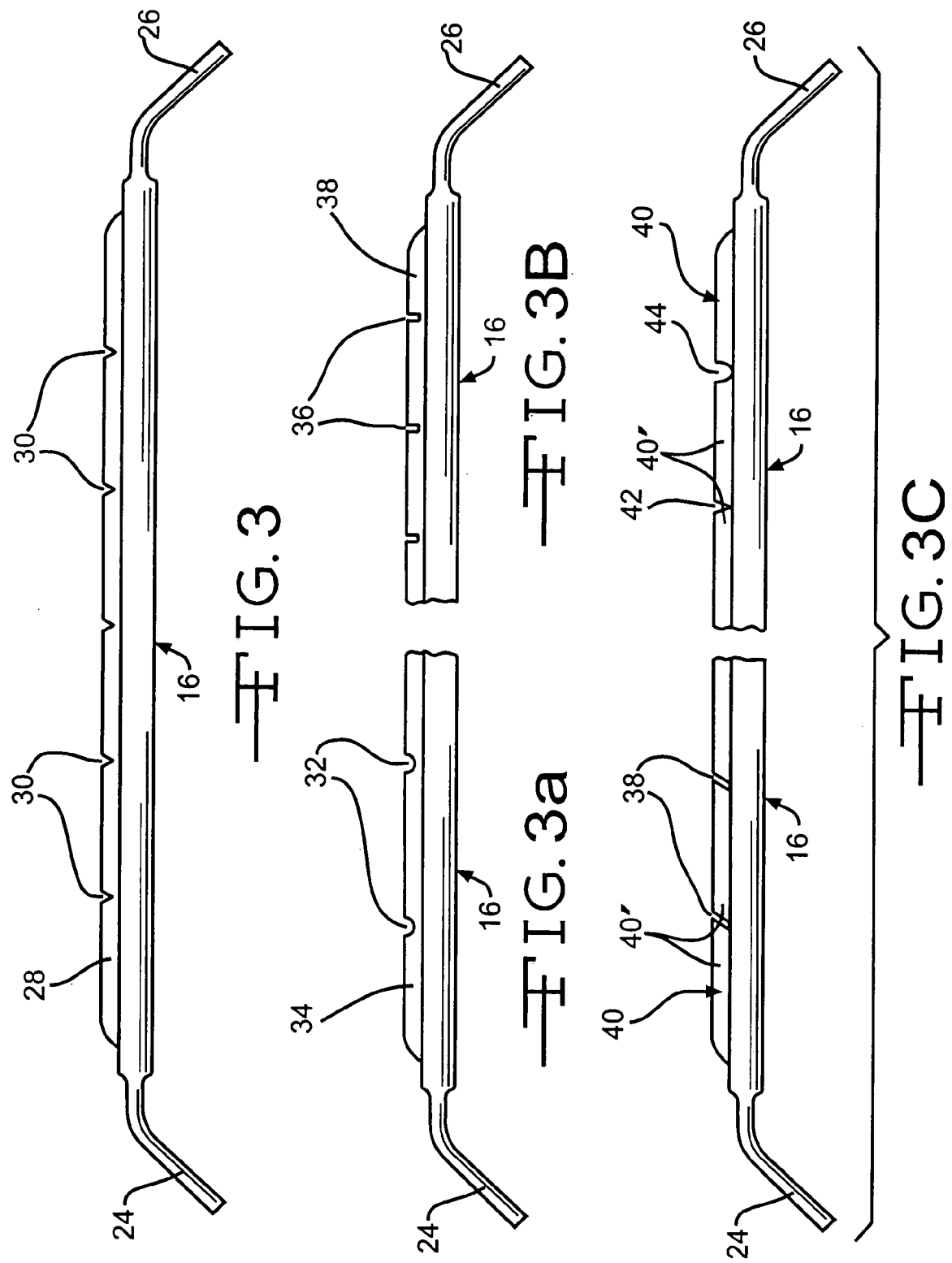

COOLING APPARATUS FOR FIBERIZING BUSHINGS

The present invention involves fluid cooled, directly or indirectly, parts for fiberizing bushings such as cooling tubes that cool the tips that form fibers from a molten material, the meniscus at the end of each tip and the fibers as they emerge from the meniscus. The present invention also includes directly or indirectly fluid-cooled parts for fiberizing bushings that do not have fiber forming tips, i.e. bushings that form fibers under an orifice plate, and the method of using these cooling parts.

In the manufacture of continuous fibers from a molten material like molten glass, the molten material is often generated by a tank furnace and distributed to a plurality of fiberizing bushings via one or more channels and into one or more bushing legs connected to the channel(s). Each bushing leg comes off the channel at about 90 degrees and contains a plurality of spaced apart orifices in the bottom to supply bushings that are mounted to the underneath side of each leg.

Precious metal bushings made from alloys of platinum and rhodium and used for making continuous glass fibers are well known, having been in use for more than 50 years. Many types of bushings exist for converting molten glass into continuous glass fiber and products. Typical types of bushings are shown in U.S. Pat. Nos. 3,512,948, 4,155,732, 4,272,271 and 4,285,712, the disclosures of which are hereby incorporated by reference. All the bushings shown in these patents teach the use of a perforated plate or screen, welded to the end walls and sidewalls at some distance above a tip plate containing hundreds or thousands of nozzles or tips where molten glass first emerges from the bushing and is converted to continuous glass fibers by cooling and drawing, attenuating, in a known manner.

It is typical to use cooling tubes, with or without one or more short fins attached, suspended below the tip plate and located close to the tips to cool the molten tips and the molten glass as it emerges from the tips and as the molten glass is attenuated or drawn into fibers of desired diameter. Some previous patents which show cooling tubes are U.S. Pat. Nos. 4,337,075, 4,397,665, and 5,244,483, the disclosure of which is incorporated herein by reference. During operation cooling water flows through the cooling tubes to carry away heat absorbed by the cooling tubes. It is also known to use solid and/or hollow cooling fins and other cooling apparatus below the tip plate to remove heat from below the tip plate as shown in U.S. Pat. Nos. 3,264,076, 3,708,271, 3,746,525, 4,824,457, 5,693,118, 5,925,164, 6,192,714, and 6,408,654, the disclosures of which are incorporated herein by reference.

United States Published Patent Application No. 20050092031 discloses using nickel-titanium alloy cooling tubes. The nickel-titanium alloys used in this invention contain substantial percentages of nickel and titanium and can contain other materials in small amounts. The compositions of these alloys remain in a martensite crystal structure or phase from room temperature to about 200 degrees F. These alloys are equi-atomic intermetallic alloys that readily form two phases at elevated temperatures above about 200 degrees F., an ordered austenitic phase and a lower temperature martensitic phase. and span above 1500 degrees F. These tubes work good, but the top of the fin tends to warp because it is hotter than the bottom of the fin that is connected to the water cooled tube. This warping causes the distance between the fin and the tips to vary and this affects the uniformity of the heat removal from the tips and the molten cones.

SUMMARY OF THE INVENTION

The present invention includes a hollow cooling tube comprised of precious metal, precious metal alloy or base metal alloys including Hastelloy® C 2000 Ni—Cr—Mo alloy, Ni—Ti alloys or combinations thereof. The cooling tubes of the invention are comprised of a hollow tube and one or more fins attached to the external surface of the hollow tube for use beneath a tip plate or an orifice plate of a fiberizing bushing and optionally one or more fins attached to an opposite surface of the hollow tube, the one or more fins having notches and/or slots in at least a portion of the fin(s), that portion farthest away from the hollow tube. The fin(s) on these cooling tubes can also comprise two or more fins, or fin sections arranged end-to-end, but spaced apart on the cooling tube to form gaps of at least about 0.05 mm but no more than about 1.01 mm between fin sections per each 25.4 mm of uninterrupted fin length. The two or more fins can also be fins in-line on the hollow tube, but with a relatively wide spacing between adjacent ends of the fin, more than about 3.18 mm, to accommodate tip plate or orifice plate external supports or other hardware, and/or two or more parallel fins spaced apart. The cooling tubes of the invention are used with fiberizing bushings to make fibers like glass fibers, glassy material fibers and polymer fibers.

The invention also includes the use of these cooling tubes in the manufacture of glass fibers and fibers of any other material which requires cooling during the process of forming fibers from a molten material. The gap(s), notch(es) and/or slot(s) allow the top portion of the fin to expand more than the bottom portion of the fin without distorting the fin(s). A "gap" extends from the top of the fin clear to the bottom of the fin or the top of the tube part of the cooling tube and the sides of the "gap" can be straight, tapered or curved. A "notch" extends from the top of the fin to only part way down the height of the fin and is v or u shaped. A "slot" has straight sides and extends from the top of the fin to only part way down the height of the fin.

Precious metal cooling tubes are known in the art and are comprised of platinum, palladium, platinum rhodium alloys, platinum palladium alloys, platinum ruthenium, platinum iridium, palladium iridium, palladium ruthenium and others.

The Hastelloy® C 2000 alloy typically contains 53-57 wt. percent Nickel, 22-24 wt. percent Chromium, 15-17 wt. percent Molybdenum, 2.5-3 wt. percent iron, 0-2 wt. percent Cobalt, about 1.6 wt. percent Copper, about 0-0.5 wt. percent Aluminum, about 0-0.5 wt. percent Manganese, about 0.08 wt. percent Silicon, about 0-0.01 wt. percent Carbon and zero—trace amounts of impurities.

A family of Nickel-Titanium alloys used in the present invention is called NITINOL®, such as 55 NITINOL®, available from the Timet Division of the Titanium Corporation of America located in Toronto, Ohio. This alloy has a composition of about 55 percent nickel, about 45 percent of titanium and minor amounts of iron and nitrogen. Another family of Ni—Ti alloys for use in the present invention are known as types S, N, C, B, M, and H. These alloys have a nickel content in the range of about 55 and 56 wt. percent, and usually the balance, except for trace amounts, being titanium. Chromium can be present in amounts less than about 0.3 wt. percent. Other similar nickel-titanium alloys are suitable for use in the present invention.

The gapped, notched and/or slotted cooling tubes not only remain un-warped by thermal stresses during use on a fiberizing bushing, but also are easier to bend to accommodate a sagging tip plate on the bushing than cooling tubes having fins without gaps, notches or slots.

BRIEF DESCRIPTION OF DRAWINGS

FIG. 2 is a side view of a typical cooling tube with a fin attached made according to the present invention.

FIGS. 2A-2D are crossections of some optional cooling tube shapes.

FIG. 3 is a side view of one embodiment of a cooling tube of the invention.

FIG. 3A is a partial side view another embodiment of a cooling tube of the invention.

FIG. 3B is a partial side view of another embodiment of a cooling tube of the invention.

FIG. 3C is a partial side view of ends of other embodiments of cooling tubes of the invention showing different usable gap configurations.

DETAILS

Figure 1:
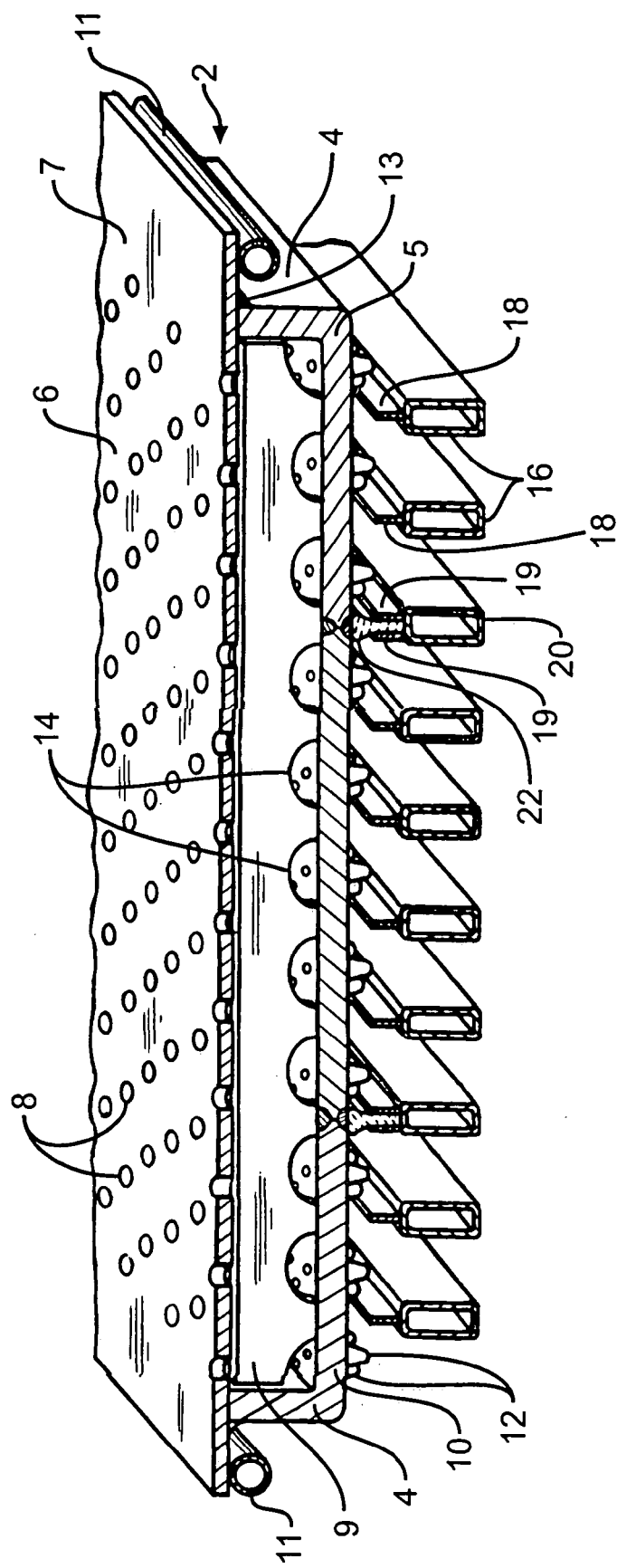
FIG. 1 is a crossectional perspective view along the length of a conventional fiberizing bushing showing a tip plate, tips, and cooling tubes with fins attached.

Precious metal bushings are used to make fibers from molten materials like glass, polymers, and glassy materials. A cooling tube type bushing 2 is partially shown in FIG. 1, a perspective cross-section through the length. The bushing 2 is made from a platinum/rhodium alloy having a rhodium content ranging from 10 to about 30 percent, typically 15-25 percent. The bushing 2 comprises two sidewalls 4 (see FIG. 2), a perforated plate and flange 6. The flange portion 7 of the perforated plate and flange 6 projects beyond the sidewalls 4 and end walls (not shown) and extends around the entire upper periphery of the sidewalls 4 and end walls. The perforated plate portion of the perforated plate and flange 6 has holes 8 therethrough to allow molten glass to pass through. The perforated plate and flange 6 is welded to the upper edges of the sidewalls 4 and the upper edges of the two end walls with weld 13. Cooling ring 11 is mounted under the flange portion 7 as is well known.

A plurality of hollow nozzles or tips 12 are formed in or welded to a tip or orifice plate 10 in or around orifices. Normally, the tips 12 are arranged in rows down the length or along the width of the bushing 2. In the bushing 2, the tips 12 are preferably arranged in pairs of staggered rows running along the length of the bushing 2 in a known manner, e. g. as shown in U.S. Pat. Nos. 4,337,075 and 6,196,029 (incorporated herein by reference). The perforated portion 6 of the perforated plate and flange 7 is spaced above the tip plate 10. The tip plate 10 is either a part of the sidewalls 4 or is welded, at the intersection 5 between the tip plate 10 and the end walls and the sidewalls 4 of the bushing 2. Internal supports 9 are welded to the top surface of the tip plate 10 to reduce sagging of the tip plate 10. The internal supports 9 have cutouts 11 above the orifices for the tips 12.

A plurality of cooling tubes 16, made from a nickel-titanium alloy according to the present invention, are spaced below the tip plate 10 and between double rows of tips 12. The cooling tubes 16 have an optional at least one fin 18 on top of the tubes 16 for cooling the tips 12, molten glass flowing from the tips 12 and fibers that are formed at the end of the tips 12 when the bushing 2 is operating. Some of the cooling tubes can have double fins 19 in a known manner such as tubes 20. A ceramic linear support 22 can lay on each tube 20 and extend to the bottom surface of the tip plate 10 in a known manner to provide support for the tip plate 10 in the manner disclosed in U.S. Pat. Nos. 4,356,016 and 6,196,029. Large bushings, having more than 1200 tips 12, use at least one of the double fin cooling tubes 20 and ceramic supports 22. The cooling tubes are supported in a well known manner, such as disclosed in U.S. Pat. No. 5,244,483, incorporated herein by reference.

A side view of the cooling tube 16 is shown in FIG. 2. On this cooling tube 16, the fin 18 is in several parts 18' having gaps 29 between the parts 18' of the fin and also having a relatively wide spacing 17 in the center portion of the cooling tube 16, but it can be continuous from one end to another. The cooling tubes 16 are hollow to allow any cooling fluid such as a gas or a liquid to pass through the tube. Water, such as plant process water, is typically used as the cooling fluid, but any cooling fluid including air can be used. The cooling tube 16 typically has an optional inlet tube 24 on one end and an optional outlet tube 26 on the other end, both having a round crossection for easy connection to flexible hoses to connect to the cooling fluid source and to carry away the exhaust cooling fluid to a return or drain system. The fins 18 typically range in height from about 2.5 mm to about 7 mm and in width from about 0.5 mm to about 4-5 mm.

While the cooling tubes 16 shown in FIG. 1 are rectangular, with or without radiused corners in cross-section, they can be oval, round or square, as shown in FIGS. 2A, 2B, 2C and 2D. As shown by FIG. 2B, a second fin 23 can be mounted opposite the fin 18 and attached to the bottom of the tube 16. Any crossectional shape is suitable for the cooling tubes of the present invention and they can have no fin 18, one, two or more than two fins.

FIG. 3 is a side view of a cooling tube comprising a hollow tube 16 and a fin 28 attached the top surface of the hollow tube 16. The fin 28 has v-shaped notches spaced apart along the length of the fin 28.

FIG. 3A is a partial side view of a cooling tube comprising a hollow tube 16 and a fin 34 attached the top surface of the hollow tube 16. The fin 34 has u-shaped notches spaced apart along the length of the fin 34.

FIG. 3B is a partial side view of a cooling tube comprising a hollow tube 16 and a fin 36 attached the top surface of the hollow tube 16. The fin 36 has slots spaced apart along the length of the fin 34.

FIG. 3C is a side view of a cooling tube comprising a hollow tube 16 and a fin 40 attached the top surface of the hollow tube 16 comprising a plurality of fin sections 40'. The fin 40 has gaps spaced apart along the length of the fin 40 between the fin sections 40'. The gaps 38 have straight sides that are parallel, but the sides slant from vertical. The gap 42 has tapered sides that join, or nearly join, at the top of the hollow tube 16, forming a v-shaped gap 42. The gap 44 has curved sides that form a u-shaped gap 44. This figure shows that the shape of the gap can be varied in these and other ways to form a relief from differential expansion of the fin 40, fin sections 40' while still performing the important cooling function of the fin 40.

In operation molten material like glass exits the tips 12 of the bushing 2 and forms a cone-shaped meniscus below each tip. A fiber is pulled away from each meniscus at a very high speed to form a fiber of desired diameter in a well known manner. It is necessary to cool the molten glass meniscus properly to prevent the fibers from breaking and to prevent the molten glass from spreading up the outside of the tips 12 and across the bottom of the tip plate 10 between the tips 12 when the fibers break, an event called flooding of the bushing.

Flooding causes the bushing to be taken out of production for extended time while a hot, tedious job of de-flooding the bushing is undertaken.

The surface of the cooling tubes 16 and fins 18, because of their close proximity to the hot tip plate 10, typically over 1100 degrees C., and the hot molten glass, becomes quite hot. Further, these members are exposed to corrosive volatiles coming from the molten glass and to water vapor coming from hot fibers further below the bushing where the fibers are being further cooled by water sprays. These conditions are severe. In addition, because the tip plate 10 sags with time in operation, the cooling tubes 16 and fins 18 must be bent appropriately to maintain the important spacing between the fins 18 and the end of the tips 12. If that spacing is not maintained, the rate of fiber breaks per hour will increase dropping the fiberizing efficiency and the production rate and increasing the manufacturing cost. If the metal tube does not bend easily or quickly, in place, the operator or mechanic will not achieve the best spacing because of the uncomfortable conditions he must work in to do this, or he will damage the cooling member or bushing causing additional lost production and manufacturing costs. Only a few metals have proven suitable to provide the cooling function, the necessary malleability to allow for easy bending or the cooling member while it is in operation to compensate for tip plate sag (affects fiberizing efficiency or fiber breaks/hour) and reasonable cooling member tube life. Those few metals or alloys are all precious metals, or largely precious metals, requiring a substantial capital investment and a corresponding high cost.

In the present invention, at least the cooling tubes 16 and more typically also the fins 18 are made from the metals and alloys described in the Summary above. The Ni—Ti alloys contain at least about 98 weight percent nickel plus titanium, preferably at least about 99 weight percent. Some of the precious metal and precious metal alloy cooling tubes perform best overall, but are very capital intensive due the high cost of platinum, rhodium and palladium. The Hastelloy® C2000 alloys are much less costly and provide corrosion resistance that is equal to or superior to the precious metal/alloy tubes. The NiTi alloys used in this invention can contain other materials in small or trace amounts, such as chromium and/or iron and/or nitrogen. One family of Nickel-Titanium alloys used in the present invention is called NITINOL®, such as 55 NITINOL®, available from the Timet Division of the Titanium Corporation of America located in Toronto, Ohio. This alloy has a composition of about 55 percent nickel, about 45 percent of titanium and minor amounts of iron and nitrogen. Another family of Ni—Ti alloys for use in the present invention are known as types S, N, C, B, M, and H. These alloys have a nickel content in the range of about 55 and 56 wt. percent, and usually the balance, except for trace amounts, being titanium. Chromium can be present in amounts less than about 0.3 wt. percent. Other similar nickel-titanium alloys are suitable for use in the present invention. Preferably, the nickel content of the alloy will be in the range of about 55-56 wt. percent. Regardless of the composition, these alloys used in the present invention remain in a martensite structure from room temperature to about 200 degrees F. Also, these alloys, if overheated and converted to a harder, more rigid austenite structure, quickly revert to the martensite structure when cooled back below about 200 degrees F.

The metals and alloys used in this invention are sufficiently malleable to be bent easily to adjust the metallic cooling members as a tip plate or orifice plate of the bushing sags yet sufficiently rigid to avoid damage during routine operation and maintenance of the bushing. The cost of these alloys are far less than that of precious metal alloys currently being used and far superior to nickel or copper currently used in fin-shield type cooling members in one or more of the areas of malleabity, life, and resistance to corrosion. The alloys used in this invention are oxidation resistant up to about 800 degrees F. and form on the surface a thin oxide film that protects the alloy up to about 1500 degrees F. The alloys used in this invention begin to deteriorate and spall above 1500 degrees F.

Example

One embodiment of a typical cooling tube of the invention is made from Hastelloy® C2000 alloy, both the tube and the fin and looks something like the cooling tube illustrated in FIG. 2, except there are 8 fin sections 18, instead of 4, in each of the two fins shown. Each fin section 18 is about 31.16 mm long. The fin height was about 4.76 mm high and about 1.27 mm thick. The hollow tube 16 was of the same dimensions as the prior art tube shown in FIG. 2A. The relatively wide gap 17 was about 17.46 mm and the gaps 29 are about 0.63 mm wide. These cooling tubes performed very effectively under a tip plate bushing, remaining unwarped due to thermal stresses and were easier to bend by hand or with conventional tools to compensate for a sagging tip plate of the bushing, the sagging condition being typical with operating time on bushings making textile or continuous glass fibers.

Several types of fiberizing bushing cooling tubes have been shown in detail above, but there are many variations of these and very possibly other metal cooling apparatus that are similarly positioned near a fiberizing bushing. The present invention as described by the following claims is also applicable to those variations thereof.

The invention claimed is:

1. A cooling tube mounted beneath a fiberizing bushing having a plurality of tips thereon through which molten material flows through for fiberizing the molten material, the cooling tube comprising an elongated hollow tube with one or more solid fins extending from a surface of the cooling tube and running lengthwise along a major portion of a length of the cooling tube for cooling one or more of the tips on the fiberizing bushing, molten material flowing out of the tips, and fibers formed from the molten material, the cooling tube with the one or more solid fins comprised of a metal or a metal alloy, a top surface of each of the one or more solid fins closest to the tips being interrupted with spaced apart gaps, notches and/or slots in at least a top portion of each of the one or more solid fins, each of the one or more solid fins having a top surface closest to the plurality of tips having a height in the range of about 2.5 mm to about 7 mm from the surface of the elongated hollow tube to the top surface of each of the one or more solid fins, the gaps, notches and/or slots having a width at the top of each of the one or more solid fins in the range of about 0.05 mm to about 1.01 mm per each 25.4 mm of uninterrupted solid fin length from either a closest end of that solid fin or from an edge of a closest gap, notch or slot, the gaps, notches or slots extending at least 25 percent down the height from the top surface of each of the solid fins.

2. The cooling tube of claim 1 wherein the gaps, notches and/or slots extend a distance from the top surface of the solid fins closest to the tips down the height of the fin a distance of at least about 50 percent of the height of the fin.

3. The cooling tube of claim 2 wherein the thickness of each solid fin closest to the tips is in the range of about 0.5 mm to about 5 mm.

4. The cooling tube of claim 2 wherein the cooling tube comprises a precious metal or a precious metal alloy.

5. The cooling tube of claim 2 wherein the cooling tube comprises an alloy comprising about 53 to about 57 wt. percent Nickel, about 22 to about 24 wt. percent Chromium, and about 15 to about 17 wt. percent Molybdenum.

6. The cooling tube of claim 2 wherein the metal is a NI-TI alloy containing at least about 98 wt. percent of Nickel and Titanium combined.

7. The cooling tube of claim 6 wherein the nickel content of the alloy is in the range of about 55 to about 56 weight percent.

8. The cooling tube of claim 1 wherein the thickness of each solid fin closest to the tips is in the range of about 0.5 mm to about 5 mm.

9. The cooling tube of claim 1 wherein the cooling tube comprises a precious metal or a precious metal alloy.

10. The cooling tube of claim 1 wherein the cooling tube comprises an alloy comprising about 53 to about 57 wt. percent Nickel, about 22 to about 24 wt. percent Chromium, and about 15 to about 17 wt. percent Molybdenum.

11. The cooling tube of claim 1 wherein the metal is a NI-TI alloy containing at least about 98 wt. percent of Nickel and Titanium combined.

12. The cooling tube of claim 11 comprising a nickel content in the range of about 55 to about 56 weight percent.

13. A cooling apparatus mounted close to a fiberizing bushing comprising a plurality of tips, the cooling apparatus comprising a plurality of fluid cooled alloy cooling tubes, each cooling tube comprising a hollow tube having one or more solid fins extending from a top surface of the hollow tube and running lengthwise along a major portion of length of the hollow tube for cooling tips of the fiberizing bushing, molten material flowing out of the plurality of tips, and a plurality of fibers formed from the molten material, the plurality of the fluid cooled alloy cooling tubes with solid fin(s) comprising an alloy comprising about 53 to about 57 wt. percent Nickel, about 22 to about 24 wt. percent Chromium, and about 15 to about 17 wt. percent Molybdenum, a top surface of each of the one or more solid fins closest to the tips being interrupted with spaced apart gaps, notches and/or slots in at least a top portion of the solid fin, the gaps, notches and/or slots having a width at the top of the solid fin in the range of about 0.05 mm to about 1.01 mm per each 25.4 mm of uninterrupted solid fin length from either a closest end of that solid fin or from an edge of a closest gap, notch or slot, the gaps notches or slots extending at least 25 percent down the height, from the too surface, of the solid fin, the height of each solid fin being about 2.5 mm to about 7 mm from a surface of the elongated hollow tube to the top surface of each solid fin.

14. A cooling apparatus mounted close to a fiberizing bushing comprising a plurality of fluid cooled alloy cooling tubes, each comprising a hollow tube having one or more solid fins extending from a top surface of the hollow tube and running lengthwise along a major portion of length of the hollow tube for cooling a plurality of tips of the fiberizing bushing, molten material flowing out of the plurality of tips, and a plurality of fibers formed from the molten material, the plurality of the fluid cooled alloy cooling tubes with solid fin(s) comprising an alloy comprising at least about 98 wt. percent of Nickel and Titanium combined and comprising about 55 to about 56 wt. percent Nickel, a top surface of each of the one or more solid fins closest to the tips being interrupted with spaced apart gaps, notches and/or slots in at least a top portion of each of the solid fins, the gaps, notches and/or slots having a width at the top of each of the solid fins in the range of about 0.05 mm to about 1.01 mm per each 25.4 mm of uninterrupted solid fin length from either a closest end of that solid fin or from an edge of a closest gap, notch or slot, the gaps, notches or slots extending at least 25 percent down the height, from the top surface of each of the solid fins, the height of each of the solid fins being about 2.5 mm to about 7 mm from the surface of the elongated hollow tube to the top surface of each solid fin.

* * * * *